United States Patent [19]
Nitta et al.

[11] Patent Number: 5,841,938
[45] Date of Patent: Nov. 24, 1998

[54] DATA REPRODUCING METHOD AND DATA REPRODUCING APPARATUS

[75] Inventors: Hajime Nitta, Kanagawa; Kiyoshi Ota, Tokyo, both of Japan

[73] Assignee: Sony Corporation, Tokyo, Japan

[21] Appl. No.: 520,838

[22] Filed: Aug. 29, 1995

[30] Foreign Application Priority Data

Sep. 5, 1994 [JP] Japan ................................. 6-234525

[51] Int. Cl.$^6$ .............................. H04N 5/91; H04N 5/917
[52] U.S. Cl. ............................................ 386/68; 386/111
[58] Field of Search .................................. 386/111, 112, 386/109, 124, 123, 68, 27, 33, 35; 360/32, 33.1; H04N 5/91, 5/917

[56] References Cited

U.S. PATENT DOCUMENTS

| 5,140,437 | 8/1992 | Yonemitsu et al. | 358/342 |
| 5,282,049 | 1/1994 | Hatakenaka et al. | 358/335 |
| 5,377,051 | 12/1994 | Lane et al. | 360/33.1 |

FOREIGN PATENT DOCUMENTS

WO 94 17631 A   8/1994   WIPO .

*Primary Examiner*—Robert Chevalier
*Attorney, Agent, or Firm*—Frommer Lawrence & Haug LLP; William S. Frommer

[57] ABSTRACT

Decoding data in a special mode is provided without frequent access to a disk. The reproduced data, corresponding to encoded video frames, is written to a storage memory during a normal mode. Attribute information is stored for each encoded video frame which includes the type of encoding for each encoded video frame and its position within the storage memory. In a special mode, encoded video frames are read from the storage memory in a special sequence. Encoded video frames needed to decode a respective encoded video frame are selectively read from the storage memory according to the attribute information. It becomes unnecessary in the present invention, therefore, to reproduce the data necessary for decoding during a special mode, thereby shortening access to the disk and smoothing reproduction of the encoded video frames during the special mode.

22 Claims, 12 Drawing Sheets

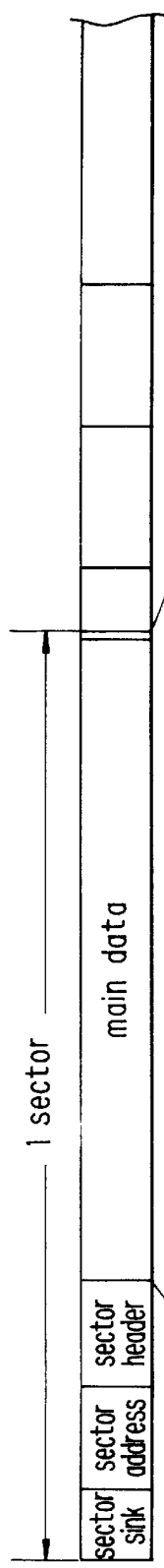
FIG. 2A
FIG. 2B
FIG. 2C
FIG. 2D

FIG. 3

| | | | | | | | |
|---|---|---|---|---|---|---|---|
| Switch 16d | a | b | c | c | c | c | c | b |
| Memory 16a | | $I_0$ | | | | | | |
| Memory 16b | $P_0$ | | | | $P_1$ | | | $P_2$ |
| Memory 16c | | $B_0$ | $B_1$ | $P_0$ | $B_1$ | $B_2$ | $B_3$ | |
| Switch 16e | a | c | c | b | $P_0$ | c | c | a |
| Display | | $I_0$ | $B_0$ | $B_1$ | $P_0$ | $B_2$ | $B_3$ | $P_1$ |

During Normal Reproduction

Structure of Interframe Prediction

1GOP (Group Of Picture)

Structure of Recording Frames

1GOP

DATA REPRODUCING METHOD AND DATA REPRODUCING APPARATUS

BACKGROUND OF THE INVENTION

1. Field of the Invention

The present invention relates to a data reproducing method and a data reproducing apparatus suited for reproducing data such as images and sounds recorded in an optical disk, a magneto-optic disk or the like and more particularly to those suited for special reproductions such as a backward reproduction.

2. Description of the Related Art

The MPEG (Motion Picture coding Experts Group) method has been proposed as a method for compressing and coding digital image signals recorded in a conventional digital video disk (hereinafter referred to as a DVD). Then, an example of a MPEG encoder will be explained below with reference to FIG. 9. The MPEG encoder is a type of encoder which is adapted to compress signals by predictive coding, wherein digitized image input signals are blocked into each block (MB) which is a minimum unit of motion compensative prediction and motion vectors for the motion compensative prediction are detected per each block in a motion detecting circuit 101.

While this block is predictive-coded by the ensuing predictive coding section, it is classified into four blocks of (1) an intra-block in which DCT (Discrete Cosine Transform) is directly implemented on the image input signals, (2) a forward block in which prediction is made only from the front direction, (3) a backward block in which prediction is made only from the rear direction, and (4) a bi-directive block in which prediction is made from both directions.

That is, a DCT section 103 in the predictive-coding section implements the DCT which is one type of Fourier transform and a quantization circuit 104 quantizes DCT coefficients of that result. After the quantization, a variable length coding means 109 implements variable length coding by assigning codes whose lengths vary corresponding to a probability of occurrence. An inverse quantization circuit 105 inverse-quantizes the quantized signals and an inverse DCT section 106 implements an inverse DCT. Then, an output from a frame memory predictor 108 is added to it to reproduce the original image signals. The reproduced image signals are supplied to a subtracter 102 as prediction signals.

Predictive coding signals output from the variable length coding means 109 are multiplexed with prediction mode information and motion vector information in multiplexing means 110. Such multiplexed data is generated at irregular rates, so that it is temporarily stored in a buffer 111 and is output after leveling off the coding rates. Note that it is also possible to control a coding amount by changing a quantization scale factor q of the quantizing means 104 in response to a coding amount stored in the buffer 111 to level off the average of the coding rates.

FIG. 10a shows a structure of inter-frame prediction thus compressed and coded by the MPEG method. In the figure, one GOP (Group Of Pictures) is composed of nine frames for example; one frame of I picture, two frames of P picture and six frames of B picture. Note that GOP is a unit of coding into which one sequence of motion pictures is divided. I picture is a predictive-coded image within the frame, P picture is an inter-frame predictive-coded image predicted with reference to the preceding frame already coded (I picture or P picture) time-wise and B picture is an inter-frame predictive-coded image predicted with reference to two frames of the preceding and succeeding frames time-wise.

That is, as shown in the figure by arrows, I picture I0 is predictive-coded only within that frame, P picture P0 is inter-frame predictive-coded with reference to I picture I0 and P picture P1 is inter-frame predictive-coded with reference to P picture P0. Further, B pictures B0 and B1 are inter-frame predictive-coded with reference to two pictures of I picture I0 and P picture P0 and B pictures B2 and B3 are inter-frame predictive-coded with reference to two pictures of P picture P0 and P picture P1. Pictures thereafter are created through the predictive-coding in the same manner.

By the way, in decoding the pictures thus predictive-coded, although I picture may be decoded by itself because I picture is predictive-coded within the frame, P picture needs the preceding I picture or P picture in decoding it because P picture is predictive-coded with reference to the preceding I picture or P picture and B picture needs the preceding and succeeding I picture or P picture in decoding it because B picture is predictive-coded with reference to the preceding or succeeding I picture or P picture. Then, the pictures are rearranged as shown in FIG. 10b so as to be able to decode the pictures needed in decoding at first.

As shown in the figure, this rearrangement is made so that I picture I0 precedes B pictures B-1 and B-2 because I picture I0 is necessary in decoding B pictures B-1 and B-2, so that P picture P0 precedes B pictures B0 and B1 because P picture P0 is necessary in decoding B pictures B0 and B1, so that P picture P1 precedes B pictures B2 and B3 because P pictures P0 and P1 are necessary in decoding B pictures B2 and B3, and so that P picture P2 precedes B pictures B4 and B5 because P pictures P1 and P2 are necessary in decoding B pictures B4 and B5. Similarly, they are rearranged so that P picture P3 precedes B pictures B6 and B7.

While I pictures, P pictures and B pictures are recorded in the DVD in the sequence as shown in FIG. 10b, their coding amount is not constant among each picture and varies corresponding to a complexity and flatness of the image since those pictures are compressed and coded by means of the MPEG method as described before. Then, the data are recorded by means of sector which is defined by a certain coding amount in recording those pictures once in the DVD. FIG. 11 shows a mode for recording the data by means of the sector, wherein I picture I0, for example, is recorded in Sector m, Sector (m+1) and a partial area of Sector (m+2) and B picture B-2 is recorded in the remaining area of Sector (m+2) and Sector (M+3). Thereafter, each picture is divided and recorded sequentially in respective sectors and one GOP is recorded in Sectors m through (m+21) in this example. However, GOP is not always recorded in such number of sectors and generally the number of sectors in which one GOP is recorded varies because the coding amount varies due to the complexity and flatness of each image.

FIG. 12 shows a structural example of a data reproducing apparatus for reproducing data in the DVD thus compressed and recorded by the MPEG method.

In the figure, a disk 1 is controlled so as to turn with a predetermined number of revolutions by a spindle motor not shown. The compressed and coded digital data recorded in tracks of the disk 1 is read when laser beam is irradiated to the tracks from a pickup 2. This digital data is demodulated by a demodulating circuit 3 and is input to a sector detecting circuit 4. The output of the pickup 2 is input a phase locked loop (PLL) circuit 9 to reproduce clocks. The reproduced clock is supplied to the demodulating circuit 3 and the sector detecting circuit 4.

The digital data recorded in the disk 1 is recorded in the unit of fixed length sector as shown in FIG. 11 described before and the sector sink and sector head are appended at the head of each sector. The sector detecting circuit 4 detects delimitations of the sectors by detecting the sector sinks and detects the sector addresses from the sector heads. They are supplied to a control circuit 6. The demodulated output is input to an ECC (error correction circuit) 33 via the sector detecting circuit 4 to detect and correct its error. The data whose error has been corrected is supplied from the ECC 33 to a ring buffer 135 and written thereto under a control of the control circuit 6.

Note that the focus control and the tracking control of the pickup 2 are carried out by a tracking servo circuit and a focus servo circuit under control of a system control based on focus error signals and tracking error signals obtained from the information read by the pickup 2. Here, the control circuit 6 specifies an address on a ring buffer 135 to which the sector is written by a write pointer WP based on the sector address of each sector detected by the sector detecting circuit 4. Further, the control circuit 6 specifies an address on the ring buffer 135 to which the data to be read out is written by a read pointer RP based on a code request signal from a video code buffer 10 in the later stage. It then reads the data from the position of the read pointer RP and supplies it to the video code buffer 10.

The data stored in the video code buffer 10 is transferred to an inverse VLC circuit 11 based on the code request signal from the ensuing inverse VLC circuit 11 which implements an inverse VLC process. When the inverse VLC process is finished, the data is supplied to an inverse quantization circuit 12 and the code request signal is sent to the video code buffer 10 to request new data to be input. Further, the inverse VLC circuit 11 outputs a quantization step size to the inverse quantization circuit 12 and outputs motion vector information to a motion compensating circuit 15. The inverse quantization circuit 12 inverse-quantizes the input data in accordance to the specified quantization step size and outputs it to an inverse DCT circuit 13. The inverse DCT circuit 13 implements an inverse DCT process on the input data and outputs it to an adder circuit 14.

The adder circuit 14 adds the output of the inverse DCT circuit 13 with the output of the motion compensating circuit 15 in response to a type of picture (I, P, B) and outputs the result to a frame memory bank 16. The data rearranged by the frame memory bank 16 into the original frame sequence shown in FIG. 10b and output therefrom is converted into analog image signals by a digital to analog converter (D/A) 17 to be displayed on a display 18.

Assume here that the recorded frames shown in FIG. 10b are to be reproduced. When I picture is decoded at first, the output of the inverse DCT circuit 13 is sent to the frame memory bank 16 as it is because no interframe prediction is implemented on this type of picture. In case of P picture and B picture, decoded I picture or P picture which has been referenced when those pictures were predictive-coded is sent from the frame memory bank 16 to the motion compensating circuit 15. Then, a motion predicted image is generated by the motion vector information supplied from the inverse VLC circuit 11 and is supplied to the adder circuit 14. It is decoded as it is added with the output of the inverse DCT circuit 13 in the adder circuit 14 and is stored in the frame memory bank 16.

By the way, while the control circuit 6 supplies the data stored in the ring buffer 135 to the video code buffer 10 in response to the code request signal from the video code buffer 10, when an amount of data transferred from the video code buffer 10 to the inverse VLC circuit 11 becomes less when data processing involving simple images continues for example, an amount of data transferred from the ring buffer 135 to the video code buffer 10 also becomes less. Then, an amount of data stored in the ring buffer 135 increases and there is a possibility that the write pointer WP passes the read pointer RP, overflowing the ring buffer 135.

Due to that, an amount of data currently stored in the ring buffer 135 is calculated from address positions of the write pointer WP and the read pointer RP controlled by the control circuit 6 and when the data amount exceeds a predetermined reference value set in advance, a track jump judging circuit 7 judges that the ring buffer 135 may overflow and outputs a track jump command to the tracking servo circuit 8.

This state will be explained with reference to FIG. 13 in which the ring buffer 135 is shown mimicly as a ring and the read pointer RP and the write pointer WP are represented conceptually as being positioned on the ring buffer 135. Assuming that the read pointer RP and the write pointer WP are positioned on the ring buffer 135 as shown in the figure and that the reproducing direction is clockwise, an unread residual data amount is the area between the read pointer RP and the write pointer WP in the figure. Because the rate of the write pointer WP is normally higher than that of the read pointer RP, the write pointer WP is stopped to interrupt writing when the residual data amount exceeds a certain degree so as not cause the overflow. Then, only the read pointer RP advances, reducing the residual data amount. When the residual data amount becomes less than a certain set value, the writing is restarted and the write pointer WP is controlled so as to advance again.

When the track jump judging circuit 7 outputs the track jump command during this write interrupt, the tracking servo circuit 8 causes a track jump of the reproducing position of the pickup 2. That is, the tracking servo circuit 8 causes the pickup 2 to jump from the current position on the disk 1 to the adjoining track on the inner periphery side and no new data is written to the ring buffer 135 during a time until when the reproducing position by the pickup 2 reaches to the position before the jump, i.e. until when a sector number obtained from the sector detecting circuit 4 becomes a sector number at the time when the track jump has been made. Then, data stored in the ring buffer 135 and specified by the read pointer RP is read out as necessary to be transferred to the video code buffer 10.

Further, after the track jump, when the residual data amount of the ring buffer 135 exceeds the predetermined reference value, the writing of data to the ring buffer 135 is not restarted and another track jump is made even if the sector number obtained from the sector detecting circuit 4 coincides with the sector number before the track jump. Note that the ring buffer 135 has a memory capacity capable of storing data of at least one track (one rotation) of the disk 1. Accordingly, when the disk 1 is a CLV disk for example, its rotational cycle becomes maximum at the outermost periphery, so that it has a memory capacity of one track at the outermost periphery, i.e. a memory capacity of (rotational cycle of outermost periphery)×(data transfer rate from ECC circuit 33 to ring buffer 135).

Note that the data transfer rate from the ring buffer 135 to the video code buffer 10 is set at a value equal to or less than the data transfer rate from the ECC circuit 33 to the ring buffer 135. Thereby, a code request for data transferred from the video code buffer 10 to the ring buffer 135 may be sent out freely regardless of the timing of the track jump. Thus the data reproducing apparatus shown in FIG. 12 causes the pickup 2 to jump a track in response to the memory capacity of the ring buffer 135, so that it can prevent the video code buffer 10 from overflowing or underflowing and reproduce images having homogeneous image quality continuously regardless of complexity or flatness of the images recorded in the disk 1.

Assume here that reproduction is made by culling out B pictures in a motion image sequence in reproducing backward. Assume also that pictures are reproduced in an order of P3, P2, P1, P0, I0, . . . , beginning the reverse reproduction from P picture P3 for example. However, because P picture is interframe predictive-coded as described before, I0, P0, P1, P2 need to have been decoded in order to decode P picture P3. Accordingly, it is necessary to decode I picture and P picture preceding to a picture to be reproduced and to store them in the frame memory bank 16 in advance to run the inverse reproduction.

However, although a memory capacity of the frame memory bank 16 needs to be increased to store those reference frames to that end, the frame memory bank 16 normally has a memory capacity only for storing three frames. Due to that, if the reverse reproduction is started from P picture P3, data of that GOP is read out of the disk 1 and I picture I0 is decoded at first. It is then stored in the memory 16 and B pictures B-2 and B-1 read succeedingly are decoded with reference to I picture I0 stored in the memory 16 and are stored in the memory 16. P picture P0 read next is decoded with reference to I picture I0 stored in the memory and is overwritten to the memory 16. By repeating such decoding steps, P picture P3 is decoded, is stored in the memory 16 and is output to be displayed on the display 18.

In this case, because P picture P2 referenced in decoding in the frame memory bank 16, P picture P2 is output following P picture P3. However, P picture P1 to be output following P picture P2 cannot be output to the display 18 unless I picture I0 is decoded by reading GOP data by accessing again to the disk 1 and is stored in the memory 16 and P picture P1 read is decoded with reference to P picture P0 stored in the memory 16 after decoding B pictures B-2, B-1, Picture P0, B pictures B0 and B1.

Thus, the GOP data has to be read many times by accessing to the disk repeatedly to reproduce reversely from the disk in which data compressed by the MPEG method is recorded, it requires frequent accesses and takes time for decoding. Accordingly, the prior art data reproducing apparatus has had a problem that it cannot display reverse reproduction images smoothly and quickly. Further, by the same reason, it has had a problem when a variable-speed reproduction is run that because it requires frequent accesses to the disk and takes time for decoding, variable-speed reproduction images cannot be displayed smoothly and quickly.

SUMMARY OF THE INVENTION

Accordingly, it is an object of the present invention to provide a data reproducing method and a data reproducing apparatus which allow to run special reproductions such as a reverse reproduction quickly without accessing to a disk frequently.

In order to achieve the aforementioned goal, in a data reproducing method of the present invention for reproducing original data by demodulating data read out of a disk, by writing it to storage means and by decoding data read out of the storage means, attribute information of the data is appended per predetermined unit of the data and the data is decoded selectively in response to the detected attribute information.

The data recorded in the disk contains coded video signals or sound signals and at least the attribute information. The detected attribute information may be written to the storage means together with the demodulated data. Further, necessary data may be written selectively to the storage means based on the detected attribute information when a special reproduction mode is specified. Control means for controlling writing/reading of the storage means is provided so as to control reading timing of data read out of the storage means to be decoded. The predetermined unit is a unit of image after the decoding.

A data reproducing apparatus for realizing the data reproducing method of the present invention comprising demodulating means for demodulating data read out of a disk, control means for writing the demodulated data to storage means and for reading the data from the storage means and decoding means for decoding data read out of the storage means to the original data, further comprises detecting means for detecting attribute information indicating attributes of the data appended per predetermined unit of the data so that the data is decoded selectively in response to the detected attribute information.

In the data reproducing apparatus, the data recorded in the digital video disk contains coded video signals or sound signals and at least the attribute information. The control means may write the detected attribute information to the storage means together with the demodulated data. Further, the control means may write necessary data selectively to the storage means based on the detected attribute information when a special reproduction mode is specified. Further, the control means controls reading timing of data read out of the storage means to be decoded. The predetermined unit is a unit of image after the decoding.

According to the present invention, a type of data stream and a type of picture can be known by detecting attribute information of the data, so that only necessary data may be selectively decoded and displayed in the variable-speed reproduction mode. Thereby, it becomes unnecessary to read data necessary for decoding out of the disk repeatedly every time when an image is reproduced during the special reproduction such as the backward reproduction and the waiting time necessary for reading data out of the disk may be shortened, allowing a smooth and quick special reproduction to be realized.

It also becomes possible to run the reverse reproduction without increasing a memory capacity of the ring buffer memory. Further, if the detected attribute information is stored to the ring buffer with the data, it becomes unnecessary to store the attribute information to the control circuit and the read pointer RP may be controlled readily by the control circuit because it may be stored in the ring buffer in correspondence with the data in a relation of one-to-one.

Still more, more necessary data may be stored in the ring buffer by storing data selectively by the stream detector and the control circuit. Then, an inhomogeneity of access and reading time from the optical disk may be averaged, allowing a smooth variable-speed reproduction, by supplying data stored in the ring buffer to the decoder at homogeneous time intervals per picture to decode them.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIGS. 2a through 2d shows a state of data analyzed by a stream detector in the present invention;

FIG. 3 is a diagram showing timing of writing/reading data of a frame memory bank in the data reproducing apparatus of the present invention during normal reproduction;

DETAILED DESCRIPTION OF PREFERRED EMBODIMENTS

Figure 1:
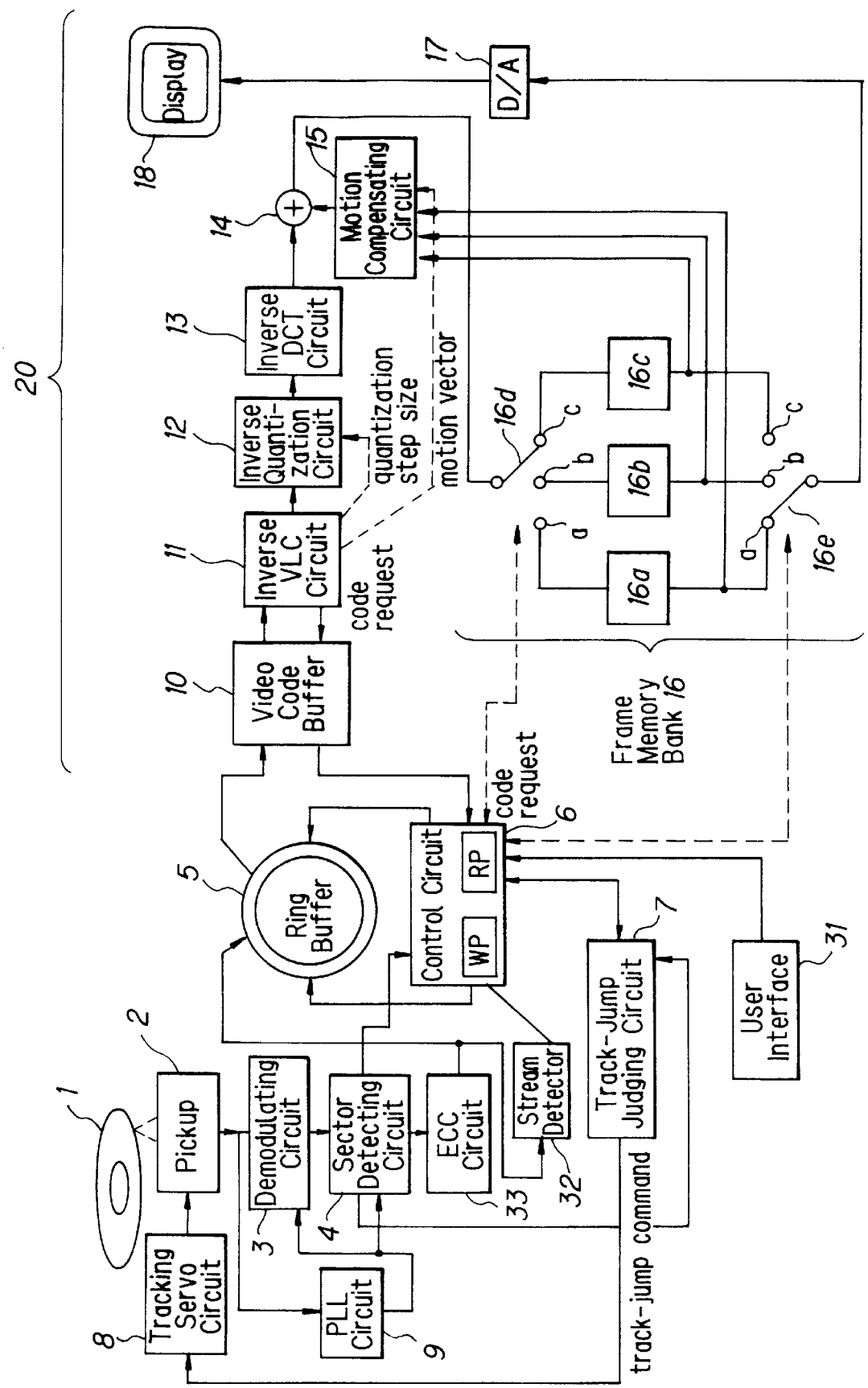
FIG. 1 is a diagram showing a structure of a first preferred embodiment of a data reproducing apparatus of the present invention.

FIG. 1 shows a structure of a first preferred embodiment of a data reproducing apparatus which realizes a data reproducing method of the present invention. In the figure, video signals or the like is compressive-coded by the MPEG method and is recorded in a disk 1, a pickup 2 reads data recorded in the disk 1 by irradiating laser beam thereon, a demodulating circuit 3 demodulates the data read by the pickup 2, a sector detecting circuit 4 detects sector information of the data output from the demodulating circuit 3 and supplies the sector information to a control circuit 6, the data output from a ECC circuit 33 is written to a ring buffer 5, and the control circuit 6 controls writing of data to the ring buffer 5 and controls reading of the data out of the ring buffer 5 based on the supplied sector information when a code request signal is applied.

A track jump judging circuit 7 judges whether the pickup 2 should be caused to jump a track or not from positions of a write pointer WP and read pointer RP and when it is judged that the pickup 2 should be caused to jump a track, gives a track jump command to a tracking servo circuit 8 to cause the pickup 2 to jump the track, the tracking servo circuit 8 controls tracking of the pickup 2 and controls the pickup 2 so as to jump to a predetermined track, and a phase locked loop (PLL) circuit 9 reproduces clocks from the data read by the pickup 2 and supplies the reproduced clocks to the demodulating circuit 3 and the sector detecting circuit 4.

A decoder 20 comprises the following components. That is, a video code buffer 10 temporarily stores the data read out of the ring buffer 5, supplies new data to an inverse VLC circuit 11 based on a code request signal from the inverse VLC circuit 11 and sends a code request signal to the control circuit 6 in response to a stored data amount to write new data from the ring buffer 5, the inverse VLC circuit 11 implements an inverse VLC process on the input data and along its output, sends the code request signal to the video code buffer 10 to request new data to be input, an inverse quantization circuit 12 implements an inverse quantization process in accordance to a quantization step size specified from the inverse VLC circuit 11 and outputs the result to an inverse DCT circuit 13, and the inverse DCT circuit 13 implements an inverse DCT process on the input data and outputs it to an adder circuit 14.

A motion compensating circuit 15 generates a motion predictive image by implementing a process in response to motion vector signals supplied from the inverse VLC circuit 11 on the decoded picture supplied from a frame memory bank 16 in response to a type of picture to be decoded and supplies it to the adder circuit 14, the frame memory bank 16 comprises three frame memories 16a, 16b and 16c and stores the decoded pictures output from the adder circuit 14 and outputs them to a digital/analog converter (D/A) 17 by rearranging them to the original picture sequence, the disk 17 converts the input data to analog video signals and sends them to the display 18 and the display 18 displays decoded reproduced video.

Further, a user interface 31 is a device for specifying the normal reproduction, variable-speed reproduction, reverse reproduction or the like to the control circuit 6, a stream detector 32 detects a type of stream and a type of picture in a case of video signals by analyzing main data of the data in the unit of sector output from a ECC circuit 33 and supplies that information to the control circuit 6, and the error correction circuit (ECC) 33 detects and corrects errors in the input data.

Figure 11:
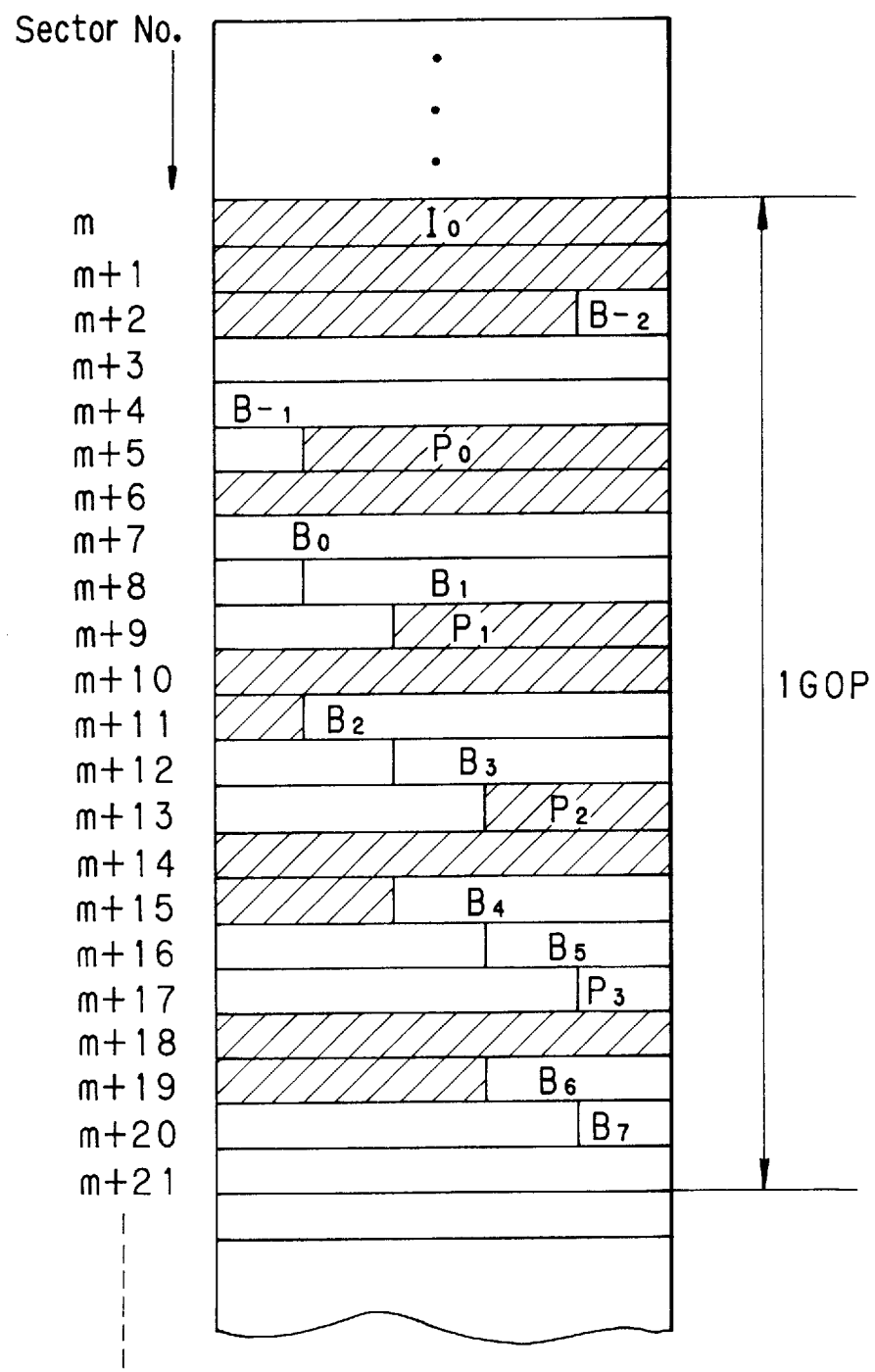
FIG. 11 is a diagram for explaining a mode for recording data in a unit of sector.
Figure 12:
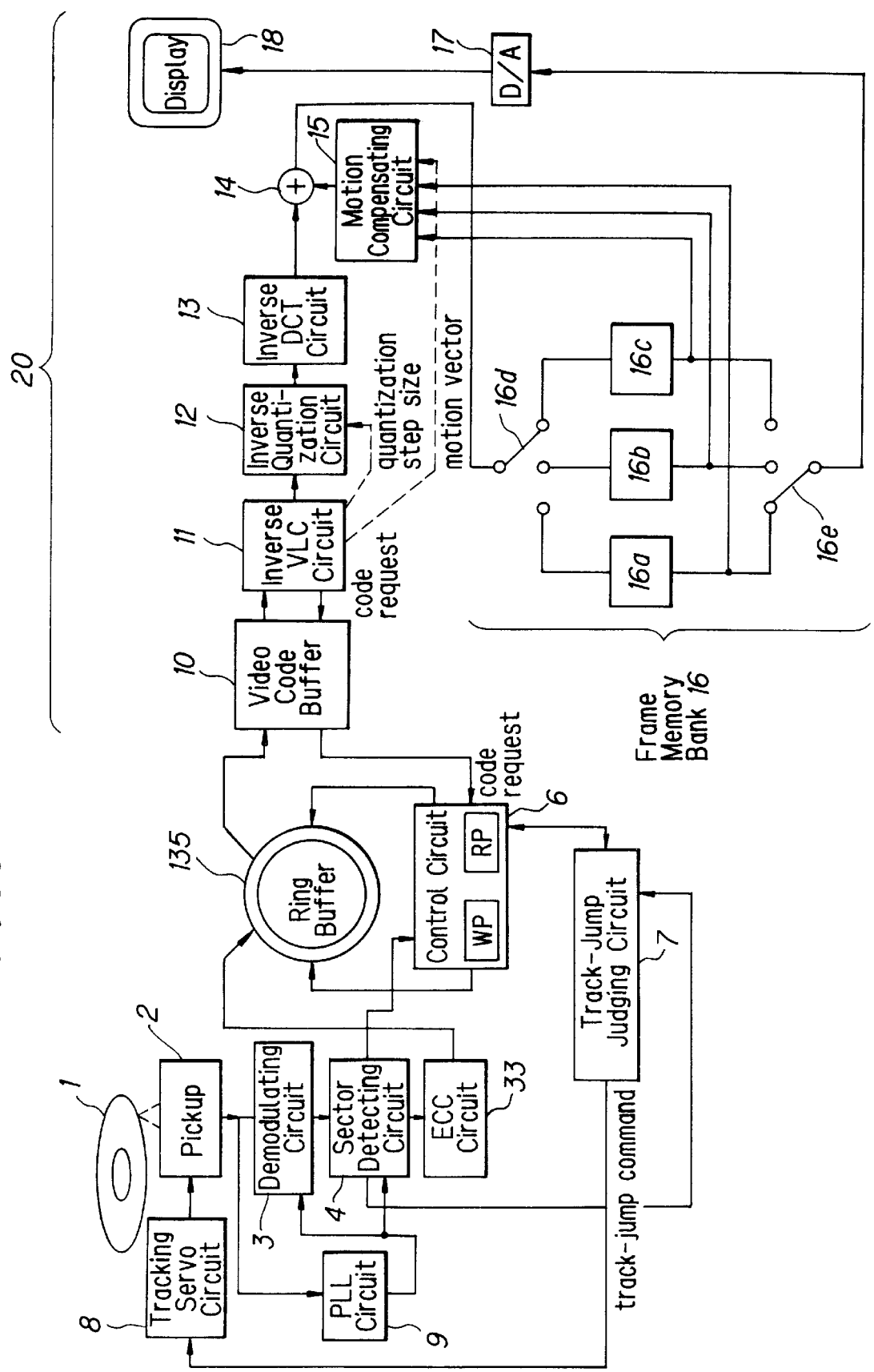
FIG. 12 is a diagram showing a structural example of another data reproducing apparatus.
Figure 13:
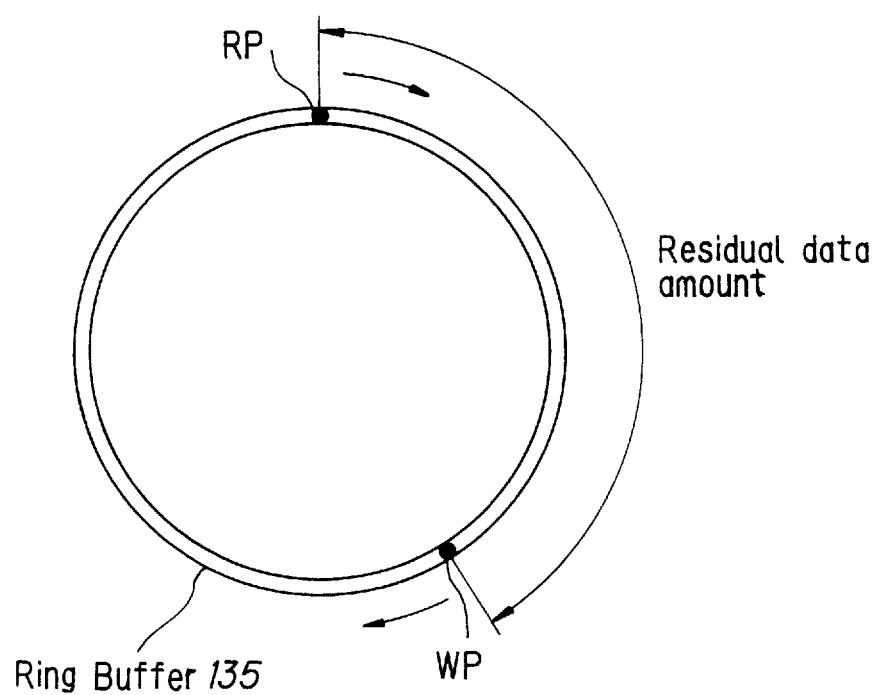
FIG. 13 is a diagram for explaining operations of the ring buffer.

While the operation of the data reproducing apparatus constructed as described above is almost same with that of the data reproducing apparatus shown in FIG. 12, it is different from that of FIG. 12 as regards the stream detector 32 and the user interface 31. Then, the following explanation will be made mainly in regard to operations based on them. While data reproduced from data recorded in the disk 1 comes in the unit of fixed length sector as shown in FIG. 11, this sector is a unit for accessing to the disk 1. The sector is composed of a sector sink at the head showing a delimitation, a sector address showing a physical sector position, a sector header showing time information and a type of the sector and main data in which video data, sound data or the like is contained.

While the stream detector 32 analyzes the main data within the sector, the main data is structured as shown in FIG. 2b for example. That is, in the main data, a type of a stream (video data or sound data) and a delimitation of types of pictures (I, P, B) in case of video data are shown by a start code at the head and a type of the start code is indicated by ID code of several bytes ensuing the start code. In this case, the start code has a pattern which never appears at another location of the main data. FIG. 2d shows a table of the ID codes and contents indicated by the ID codes, wherein "01" of ID indicates I picture, "02" of ID indicates P picture and "03" of ID indicates B picture for example.

Accordingly, in case of video signals, the stream detector 32 can detect a delimitation of pictures by detecting the start codes and can detect a type of a picture by analyzing the ensuing ID code. The stream detector 32 also supplies information on this detected main data to the control circuit 6 and the control circuit 6 stores it so that the type of the start code in the information of the main data corresponds with a pointer of the sector in which the main data is contained. FIG. 2c is a table in which "pointers indicating storage locations within the code buffer" 0, 1, 2, . . . n are pointers indicating the head or the like of the sectors and "types of start codes detected within sector (ID number)" 01, 02, and 03 indicate types of pictures contained within that sector by ID codes as shown in FIG. 2d.

This table stored in the control circuit 6 is used for controlling the read pointer RP described later. Meanwhile, the data reproduced by the reproducing circuit up to the ECC circuit 33 is supplied to and is stored in the ring buffer 5 by the control circuit 6 which controls the read pointer RP and write pointer WP in the unit of sector.

Figure 4:
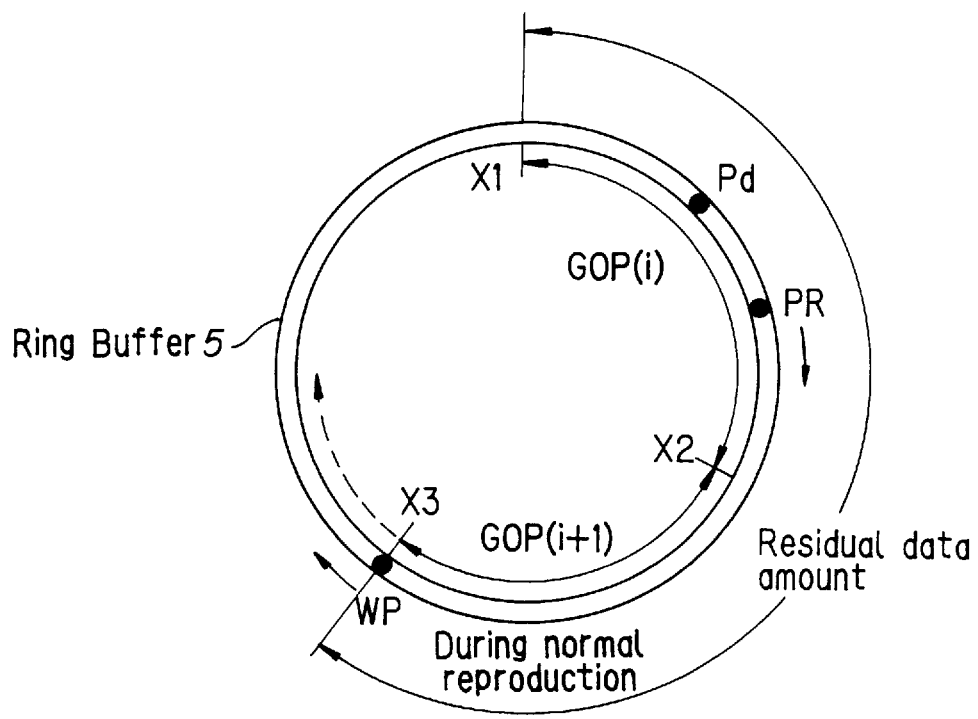
FIG. 4 is a diagram showing operations of a ring buffer of the present invention during the normal reproduction.

Next, motions of the read pointer RP and the write pointer WP when the normal reproduction mode is specified by the user interface 31 will be explained with reference to FIG. 4. In FIG. 4, Pd indicates a data position of an image displayed on the display 18 and a GOP including Pd is represented as GOP(i), which is stored in an area on the ring buffer 5 from X1 to X2. The control circuit 6 stores new data while always updating the head position of the GOP currently displayed. For example, GOP(i+1) is being stored in an area from X2 to X3 following GOP(i) and when the displayed image advances to GOP(i+1), X2 becomes the head of GOP currently displayed.

The write pointer WP is controlled by the control circuit 6 so that the write pointer WP will not pass the head of the GOP currently displayed and so that a residual data amount shown in the figure from X1 to X3 will not exceed a predetermined value. This is controlled by the same method of the data reproducing apparatus shown in FIG. 12. Thereby, data of all GOPs currently displayed is stored in the ring buffer 5 until the next GOP.

Figure 10A:
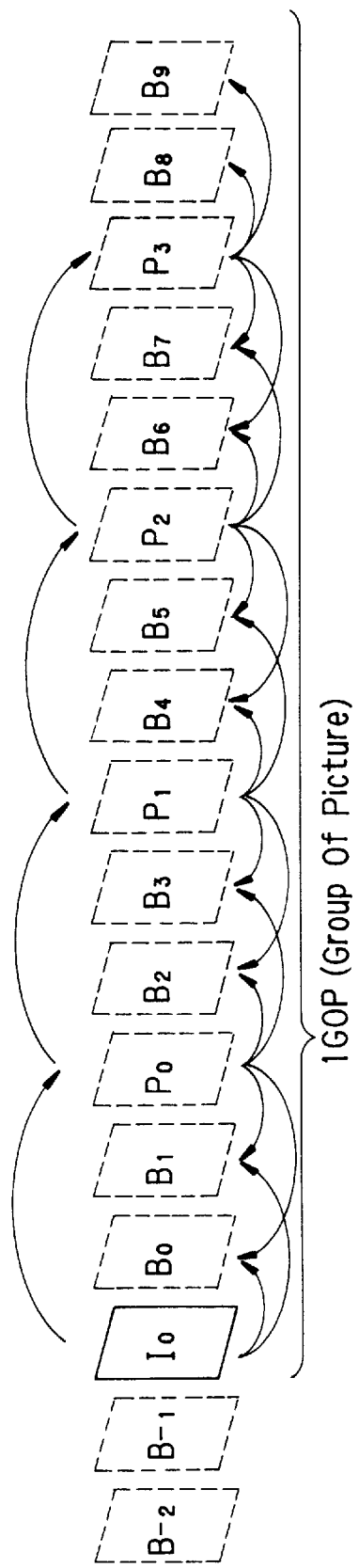
FIGS. 10A and 10B are diagrams showing examples of MPEG-implemented video image sequence.
Figure 10B:
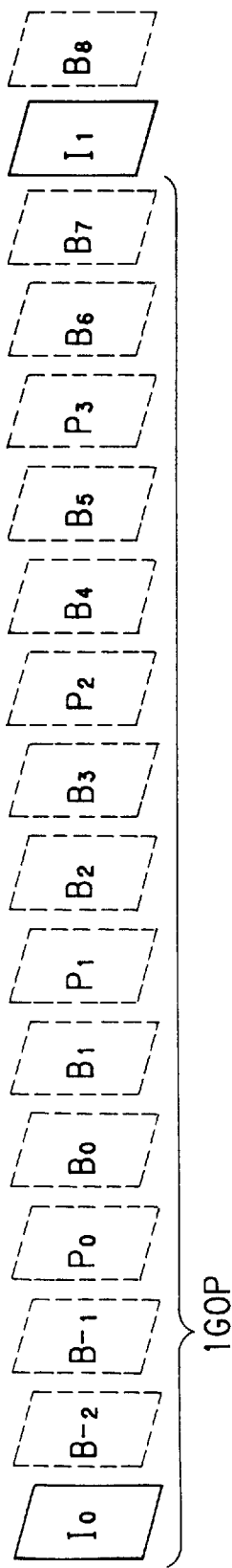

The control circuit 6 controls the read pointer RP and supplies necessary data to the decoder 20. Then, operations of the decoder 20 during the normal reproduction will be explained with reference to FIGS. 1 and 3. FIG. 3 shows timings for writing/reading decoded pictures stored in the frame memories 16a, 16b and 16c to/from the frame memory 16. The pictures decoded at this time are arranged as shown in FIG. 10b.

At first, while I picture I0 is decoded and output from the adder circuit 14, I picture I0 is stored in the frame memory 16a because a switch 16d has been switched to a contact a. Next, P picture P0 is decoded with reference to I picture stored in the frame memory 16a and is stored in the frame memory 16b via a switch 16d switched to a contact b. At this time, a switch 16e is switched to the contact a and I picture I0 is output and is displayed on the display 18. Next, B picture B0 is decoded with reference to I picture I0 stored in the frame memory 16a and P picture P0 stored in the frame memory 16b and is stored in the frame memory 16c via the switch 16d which has been switched to a contact c. At this time, the switch 16e has been switched to the contact c, so that B picture B0 is output and is displayed on the display 18.

Following to that, the switches 16d and 16e are switched sequentially with a timing as shown in FIG. 3 and pictures B1, P0, B2, B3 and P1 are output from the frame memory bank 16 with that sequence and are displayed on the display 18. Thus, the sequence of the pictures is rearranged in the frame memory bank 16 and the pictures are sent to the display 18 with the original sequence shown in FIG. 10a.

Next, operations when the inverse reproduction mode is specified by the user interface 31 will be explained. Receiving the specification of the reverse reproduction mode from the user interface 31, the control circuit 6 finds an image currently displayed on the display 18 by the switching information of the switch 16e. Then, image data currently sent from the frame memory bank 16 to the display 18 and displayed is sent repeatedly to the display 18 to display a still state.

Next, the control circuit 6 controls the write pointer WP to store data necessary for the reverse reproduction from the disk 1 to the ring buffer 5 and controls the read pointer RP to supply data of pictures necessary for the decoder 20. The decoder 20 decodes the supplied data and sends to the display 18 to display.

A method for writing data to the ring buffer 5 by controlling the write pointer WP will be explained below with reference to FIG. 5. If GOP currently displayed is GOP(i) stored in the area between X1 and X2, the control circuit 6 commands the tracking servo circuit 8 to move the pickup 2 so as to be able to read from the head of the preceding GOP(i−1). At this time, the write pointer WP abandons writing up to then and jumps to X2 to start to write data of GOP(i−1) to the ring buffer 5. Thus, the data of GOP(i−1) is written in the area between X2 and X3. The data thereafter is written while controlling so that no overflow is caused by watching the residual data amount.

Next, operations for decoding video data read by the read pointer RP during the reverse reproduction will be explained. The control circuit 6 stores the information detected by the stream detector 32 in the form of the table as described before and controls the read pointer RP by making reference to this table during the reverse reproduction. That is, the control circuit 6 finds a pointer of the ring buffer 5 where a sector of data necessary during the reverse reproduction by making reference to the table shown in FIG. 2c, specifies that pointer as the read pointer RP to read the data and supplies it to the decoder 20.

For example, a case of the reverse reproduction when the pictures are displayed on the display 18 with a sequence of P3, P2, P1, P0, I0, . . . will be explained below with reference to FIGS. 1 and 6. If the data is stored on the ring buffer 5 as shown in FIG. 11, it is necessary to decode the pictures with the sequence of I0-P0-P1-P2-P3 as described before in order to display P picture P3 at first. Then, the control circuit 6 controls the read pointer RP so that the data can be read with a sector sequence of m−(m+1)−(m+2)−(m+5)−(m+6)−(m+9)−(m+10)−(m+11)−(m+13)−(m+14)−(m+15)−(m+17)−(m+18)−(m+19) to input the data to the decoder 20 with the picture sequence of I0, P0, P1, P2 and P3.

Figure 6:
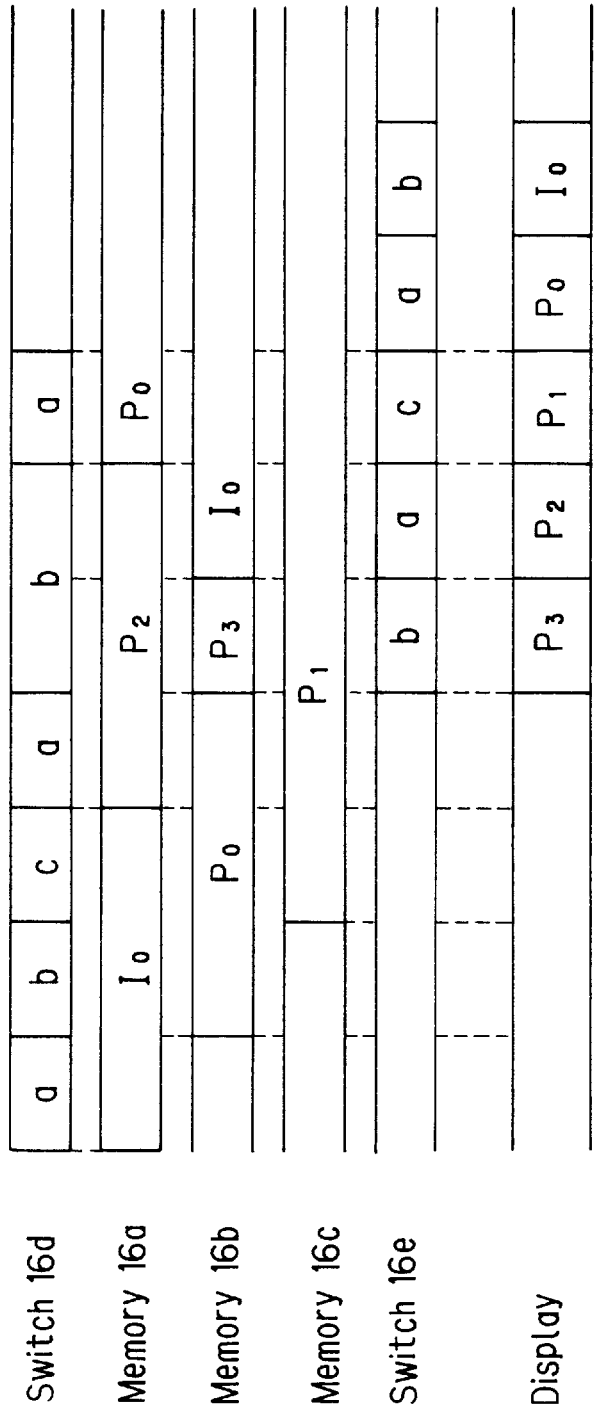
FIG. 6 is a diagram showing timing of writing/reading data of the frame memory bank in the data reproducing apparatus of the present invention during the reverse reproduction.

After being decoded in the decoder 20, the data is written/read to/from the frame memories 16a, 16b and 16c with the timing as shown in FIG. 6 and are displayed on the display 18 with the picture sequence of P3, P2, P1, P0, I0, . . . That is, while I picture I0 is decoded and output from the adder circuit 14, I picture I0 is stored in the frame memory 16a because the switch 16d has been switched to the contact a. Next, P picture P0 is decoded with reference to I picture I0 stored in the frame memory 16a and is stored in the frame memory 16b via the switch 16d switched to the contact b. P picture P1 is then decoded with reference to P picture P0 stored in the frame memory 16b and is stored in the frame memory 16c via the switch 16d switched to the contact c.

Further, P picture P2 is decoded with reference to P picture P1 stored in the frame memory 16c and is stored in the frame memory 16a via the switch 16d switched to the contact a. P picture P3 is decoded with reference to P picture P2 stored in the frame memory 16a and is stored in the frame memory 16b via the switch 16d switched to the contact b. At this time, the switch 16e is switched to the contact b and P picture P3 is output and is displayed on the display 18.

Next, when the switch 16e is switched to the contact a, P picture P2 is output and is displayed on the display 18 and I picture I0 is decoded again and is stored in the frame memory 16b. When the switch 16e is switched to the contact c in the next timing, P picture P1 is output and is displayed on the display 18 and the P picture P0 is decoded again and is stored in the frame memory 16a. When the switch 16e is switched to the contact a in the following timing, P picture P0 is output and is displayed on the display 18 and when the switch 16e is switched to the contact b in the next timing, I picture I0 is output and is displayed on the display 18. Thus, the pictures are displayed on the display 18 with the sequence of P3, P2, P1, P0, I0, . . . , allowing to run the reverse reproduction quickly. At this time, because only sectors containing necessary data are supplied selectively to the decoder by the control circuit 6, the reverse reproduction may be run without accessing to the disk 1 repeatedly.

Figure 5:
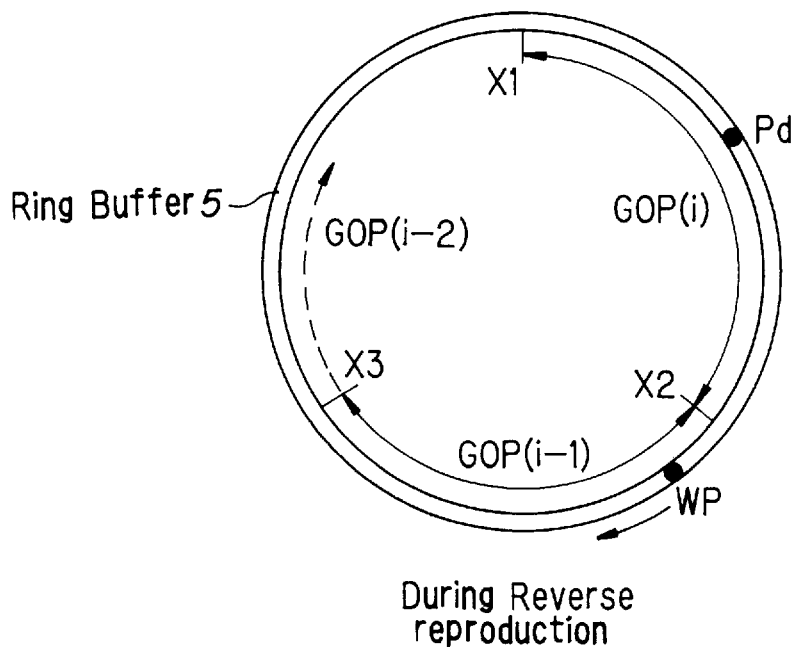
FIG. 5 is a diagram showing operations of the ring buffer of the present invention during reverse reproduction.

When the normal reproduction is specified by the user interface 31 and the mode is returned from the reverse reproduction to the normal reproduction and when the read pointer RP is positioned at Pd, displaying GOP(i+1), and write pointer WP is positioned at X2 as shown in FIG. 5, writing GOP(i−1), the writing is interrupted and write pointer WP is returned to X2. At this time, the control circuit 6 sends a command to the tracking servo circuit 8 via the track jump judging circuit 7 to move the pickup 2 to a position where data of GOP(i+1) which is the preceding GOP can be read from its head. Then, GOP(i+1) and GOP(i+2) are written to the ring buffer 5 continuously from X2. Note that the read pointer RP can reproduce GOP(i+1) following to GOP(i) by reading data from the position of Pd and supplying to the decoder 20, allowing to run the normal reproduction quickly and smoothly.

Although only I pictures and P pictures have been reproduced during the reverse reproduction in the embodiment described above, the embodiment may be applied also to the reverse reproduction reproducing pictures including B pictures. Further, it may be applied to a case of variable-reproduction in which only I pictures and P pictures are reproduced in the forward direction for example. It is possible to realize a normal/reverse reproduction of only I pictures by the construction described above by writing/reading data of only I pictures, not the whole GOP, to/from the ring buffer 5.

Figure 7:
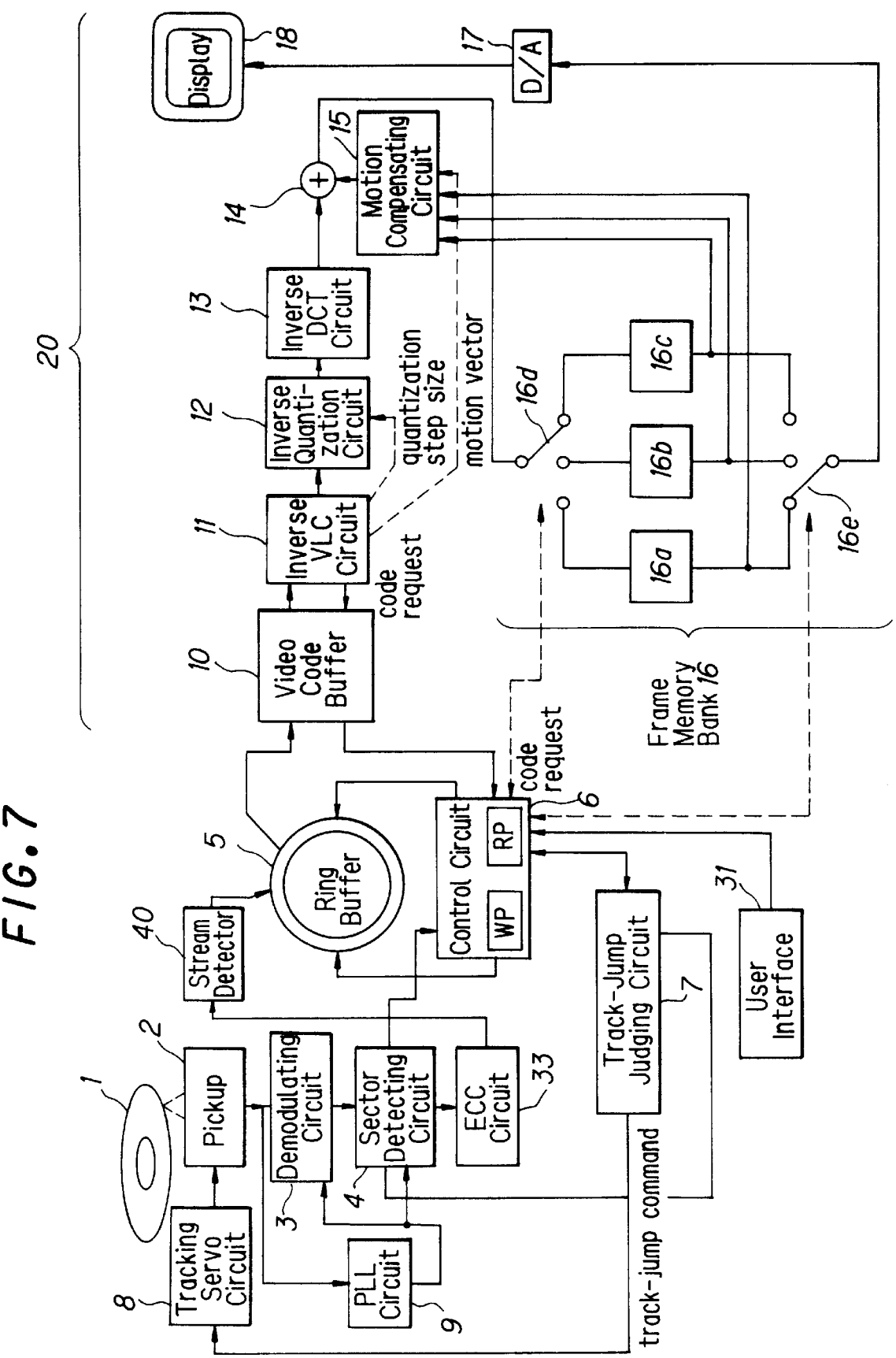
FIG. 7 is a diagram showing a structure of a modified example of the first embodiment of the data reproducing apparatus of the present invention.

FIG. 7 shows a structure of a modified example in which information detected by a stream detector 40 is stored, together with other read data, to the ring buffer 5, not the control circuit 6.

Because the data reproducing apparatus shown in this figure is different from the data reproducing apparatus shown in FIG. 1 only as regards the operation of the stream detector 40, an explanation will be made below with regard to only this part. In the modified example, the start code and ID code information detected by the stream detector 40 is sent to and stored in the ring buffer 5 together with other data. The control circuit 6 finds a sector necessary for the variable reproduction or the like by reading the information stored in the ring buffer 5 and designates a read pointer RP to the sector to supply to the decoder 20. Although the control of writing/reading of the ring buffer 5 and the information of detected result have been made in the unit of sector in the embodiments described above, it is possible to make them in another unit such as a unit of byte.

Next, a data reproducing apparatus according to a second embodiment of the present invention will be explained. Because its structure is same with the first embodiment shown in FIG. 1, an explanation thereof is omitted here and only operations thereof will be explained with reference to FIG. 1. Reproduced data is output form the ECC circuit 33 to the stream detector 32 to detect a type of stream data and a type of picture and such information is send to the control circuit 6. The control circuit 6 determines whether it is necessary data or not in response to the information supplied from the stream detector 32 and when it is necessary data, updates the write pointer WP on the ring buffer 5 to write that data. However, when it is determined to be unnecessary data, the control circuit 6 will not update the write pointer WP and that data is written on the same location in the ring buffer 5, so that it is overwritten sequentially, ending in not having been written to the ring buffer 5.

A case when the reverse reproduction is run by storing only I pictures in the ring buffer 5 will be explained below as an example of the concrete operation of the second embodiment. The reproduced data is output from the ECC circuit 33 to the stream detector 32 to discriminate the type of picture and the control circuit 6 controls the write pointer WP so that only sectors containing I picture are stored in the ring buffer 5. Then, when I pictures are stored in the ring buffer 5, the control circuit 6 sends a command to the tracking servo circuit 8 via the track jump judging circuit 7 to move the pickup 2 so as to start to read the head data of I picture of the past by one.

Figure 8:
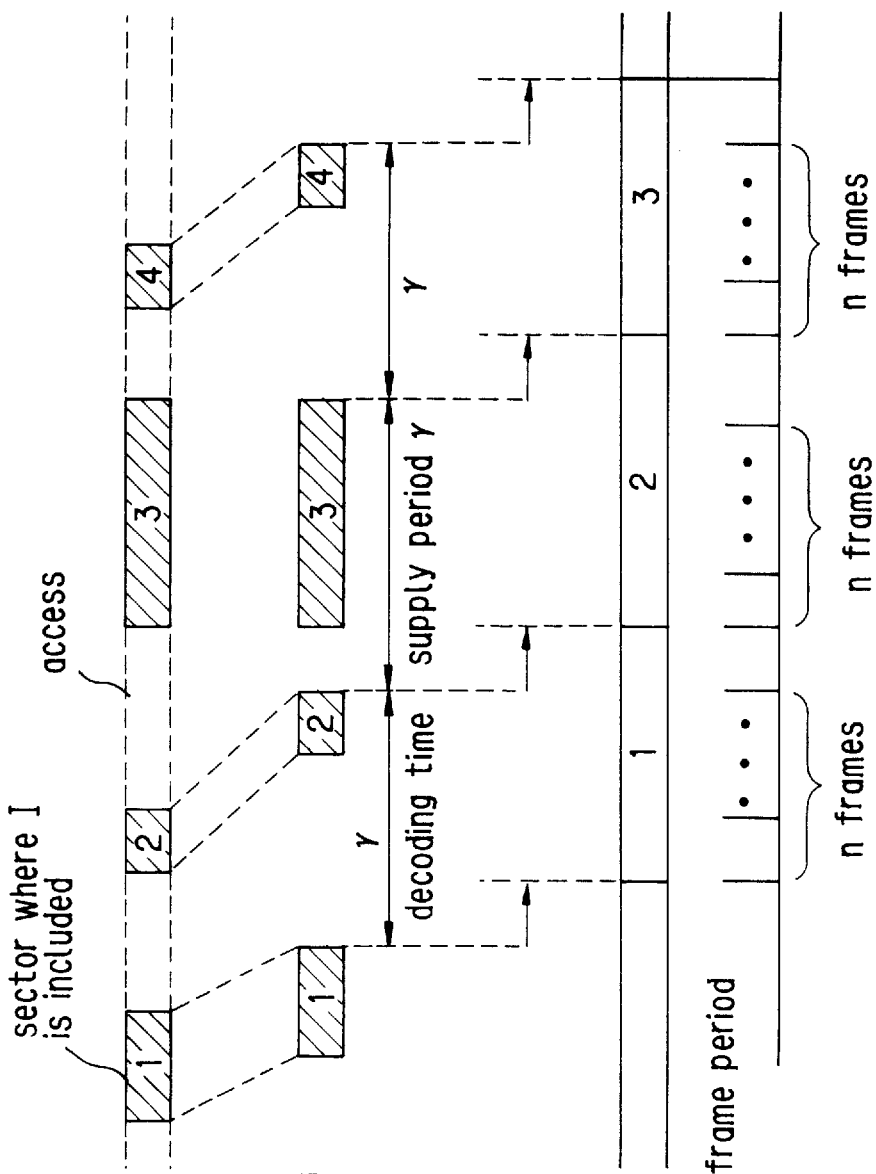
FIGS. 8a through 8c are diagrams for explaining operations of a second embodiment.
Figure 9:
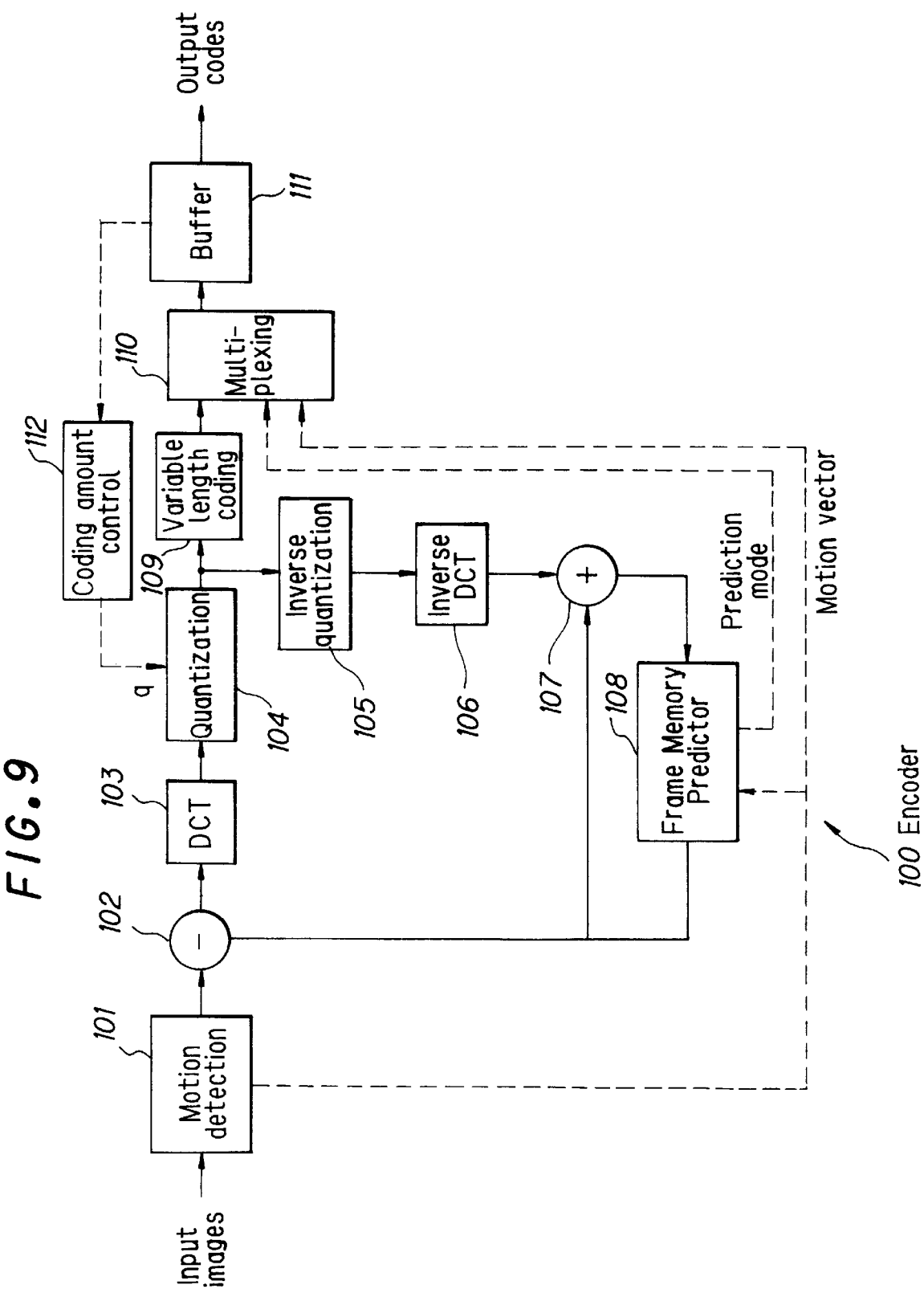
FIG. 9 is a diagram showing a structure of an encoder for compression video images by the MPEG method.

By repeating this process, only I pictures are stored in the ring buffer 5. FIG. 8a shows this timing, wherein a reading time and a time necessary for accessing are inhomogeneous because a data amount of I picture is not all the same and varies depending on a complexity and flatness of the image. Due to that, a time width is provided to the ring buffer 5 as shown in the figure to store data of I pictures.

While the control circuit 6 supplies the data to the decoder 20 while controlling the read pointer RP, it recognizes the head position of I picture on the ring buffer 5 and controls the read pointer RP and the supplying timing so that one I picture is supplied to the decoder 20 at time intervals (supplying period tau) determined by a speed for displaying I picture decided by the control circuit 6.

The time interval determined by the speed for displaying I picture (speed of variable speed) decided by the control circuit 6 here is a signal synchronized with a frame period of an image signal used for display, and the display of the picture is updated by integer times of the frame period by the speed of the variable speed.

The decoder 20 decodes in the order of supplied data and displays images of I picture on the display 18 as shown in FIG. 8c. Note that the second embodiment is applicable also to a case of variable-speed reproduction of only I pictures in the forward direction and to a case of variable-speed reproduction in the forward or backward direction in which arbitrary pictures such as only I and P pictures are displayed. Note also that the disk in the above explanation may be an optical disk or a magneto-optical disk.

While preferred embodiments have been described, variations thereto will occur to those skilled in the art within the scope of the present inventive concepts which are delineated by the following claims.

What is claimed is:

1. A data decoding method for decoding encoded video frames reproduced from a disk during a special mode, each video frame being selectively encoded as an intra- or inter-encoded frame, wherein said encoded video frames are reproduced from said disk in a sequence for decoding inter-encoded frames and stored in a buffer in said sequence in a normal mode, comprising the steps of:

storing attributes of each encoded video frame stored in said buffer during said normal mode, said attributes including whether said frame is an intra- or inter-encoded frame and a position in said buffer for each encoded video frame;

reading in a special sequence said encoded video frames from said buffer during said special mode;

determining from said attributes whether a respective encoded video frame read in said special mode is intra- or inter-encoded;

selectively reading in said special mode, according to the position in said buffer indicated by said attributes, only those frames of said encoded video frames from said buffer which are required for decoding said respective encoded video frame; and decoding for display in said special mode said respective encoded video frame using said encoded video frames selectively read from said buffer.

2. The method of claim 1, wherein said intra and inter-encoded frames are MPEG-encoded frames such that intra-encoded (I) frames are each encoded with reference to themselves, inter-encoded (P) frames are each encoded with reference to one other encoded video frame, and inter-encoded (B) frames are each encoded with reference to two other encoded video frames.

3. The method of claim 2, wherein, when said respective encoded video frame is an I frame, no other of said encoded video frames are selectively read for decoding said respective encoded video frame.

4. The method of claim 2, wherein, when said respective video frame is a P frame, a previous encoded video frame in said sequence is selectively read for decoding said respective encoded video frame.

5. The method of claim 2, wherein, when said respective video frame is a B frame, two previous encoded video frames in said sequence are selectively read for decoding said respective encoded video frame.

6. The method of claim 2, further comprising the step of storing said encoded video frames read from said buffer in respective buffers, each buffer holding a single frame and reserved for either said I, P or B frames.

7. The method of claim 1, wherein said special mode sequence is in reverse of said sequence for said normal mode.

8. The method of claim 1, further comprising the step of repeatedly displaying said respective encoded video frame in a still-state when switching between said normal mode and said special mode.

9. The method of claim 1, further comprising the step of reproducing said attributes recorded with said encoded video frames on said disk.

10. The method according to claim 9, further comprising the step of writing said attributes together with said encoded video frames reproduced from said disk to said buffer.

11. A data decoding apparatus for decoding encoded video frames reproduced from a disk during a special mode, each video frame being selectively encoded as an intra- or inter-encoded frame, comprising:

reproducing means for reproducing said encoded video frames from said disk in a sequence for decoding inter-encoded frames;

buffer means for storing in said sequence said encoded video frames reproduced from said disk during a normal mode;

control means for controlling writing/reading of said encoded video frames reproduced from said disk to/from said buffer means;

wherein, said control means stores attributes of each encoded video frame stored in said buffer means during said normal mode, said attributes including whether said frame is an intra- or inter-encoded frame and a position in said buffer of each encoded video frame;

wherein, said control means reads said encoded video frames in a special sequence from said buffer means during said special mode;

wherein, said control means determines from said attributes whether a respective encoded video frame read in said special mode is intra- or inter-frame encoded;

wherein, said control means selectively reads in said special mode, according to the position in said buffer means indicated by said attributes, only those frames of said encoded video frames from said buffer means which are required for decoding said respective encoded video frame; and decoding means for decoding said respective encoded video frame for display in said special mode using said encoded video frames selectively read from said buffer means.

12. The apparatus of claim 11, wherein said intra and inter-encoded frames are MPEG-encoded frames such that intra-encoded (I) frames are each encoded with reference to themselves, inter-encoded (P) frames are each encoded with reference to one other encoded video frame, and inter-encoded (B) frames are each encoded with reference to two other encoded video frames.

13. The apparatus of claim 12, wherein said control means, when said respective encoded video frame is an I frame, selectively reads no other of said encoded video frames for decoding said respective encoded video frame.

14. The apparatus of claim 12, wherein said control means, when said respective video frame is a P frame, selectively reads a previous encoded video frame in said sequence for decoding said respective encoded video frame.

15. The apparatus of claim 12, wherein said control means, when said respective video frame is a B frame, selectively reads two previous encoded video frames in said sequence for decoding said respective encoded video frame.

16. The apparatus of claim 12, further comprising plural buffers, each buffer holding a single frame and reserved for either said I, P or B frames.

17. The apparatus of claim 11, wherein said special mode sequence is in reverse of said sequence for said normal mode.

18. The apparatus of claim 11, further comprising means for repeatedly displaying said respective encoded video frame in a still-state when said normal mode is switched to said special mode.

19. The apparatus of claim 11, wherein said reproducing means reproduces from said disk said attributes recorded with said encoded video frames.

20. The apparatus according to claim 19, wherein said control means writes said attributes together with said encoded video frames reproduced from said disk to said buffer means.

21. The method of claim 2, further comprising the step of reproducing said encoded video frames from said disk in said sequence for decoding inter-encoded frames, wherein said sequence is an MPEG group of pictures decoding sequence.

22. The apparatus of claim 12, wherein said reproducing means reproduces said encoded video frames from said disk in said sequence for decoding inter-encoded frames, wherein said sequence is an MPEG group of pictures decoding sequence.

\* \* \* \* \*